(12) United States Patent
Fraser et al.

(10) Patent No.: US 11,748,420 B1
(45) Date of Patent: *Sep. 5, 2023

(54) OPTIMIZING DISPLAY OF DISCLOSURE BASED ON PRIOR INTERACTIONS

(71) Applicant: Wells Fargo Bank, N.A., San Francisco, CA (US)

(72) Inventors: Tyua Fraser, Livermore, CA (US); Dennis E. Montenegro, Concord, CA (US); Muhammad Farukh Munir, Pittsburg, CA (US); David Newman, Walnut Creek, CA (US); Abhijit Shetti, Pleasanton, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,571

(22) Filed: Jul. 18, 2022

Related U.S. Application Data (60) Continuation of application No. 16/881,434, filed on May 22, 2020, now Pat. No. 11,392,653, which is a division of application No. 15/635,721, filed on Jun. 28, 2017, now Pat. No. 10,664,528.

(51) Int. Cl.
*G06F 16/93* (2019.01)
*G06F 16/9032* (2019.01)

(52) U.S. Cl.
CPC ........ *G06F 16/93* (2019.01); *G06F 16/90324* (2019.01)

(58) Field of Classification Search
CPC ............................ G06F 16/93; G06F 16/90324
See application file for complete search history.

(56) References Cited

U.S. PATENT DOCUMENTS

| | | | |
|---|---|---|---|
| 6,330,546 B1 | 12/2001 | Gopinathan et al. | |
| 7,043,471 B2 * | 5/2006 | Cheung ................. | G06Q 30/02 707/999.005 |
| 7,451,099 B2 | 11/2008 | Henkin et al. | |
| 7,451,395 B2 | 11/2008 | Brants et al. | |
| 7,818,319 B2 | 10/2010 | Henkin et al. | |
| 8,359,531 B2 | 1/2013 | Grandison et al. | |
| 8,547,356 B2 | 10/2013 | Maloney et al. | |
| 8,794,972 B2 | 8/2014 | Lopucki | |

(Continued)

OTHER PUBLICATIONS

Automatically Summarize a Document Microsoft, Accessed Nov. 4, 2016.

*Primary Examiner* — Cam Y T Truong
(74) *Attorney, Agent, or Firm* — Foley & Lardner LLP (57) ABSTRACT

Systems and methods for facilitating optimization of documents based on prior interactions according to one or more example embodiments are shown. Such systems and methods make use of analyzing information obtained from financial institution computing system as well as other third party networks. Such systems and methods also make use of analyzing information stored from previous interactions with documents (e.g., financial disclosures). In some embodiments, this analysis of data allows for documents, such as disclosure documents, to emphasize features or sections that are of particular interest to the individual receiving the document. Information associated with one or more sections of a disclosure document may be pushed to account holders based on a disclosure associated event.

20 Claims, 4 Drawing Sheets

(56) References Cited

U.S. PATENT DOCUMENTS

| | | |
|---|---|---|
| 8,954,839 B2 | 2/2015 | Sharma et al. |
| 8,959,093 B1 | 2/2015 | Nerurkar |
| 9,372,849 B2 | 6/2016 | Gluck et al. |
| 2003/0204449 A1 | 10/2003 | Kotas et al. |
| 2006/0277213 A1 | 12/2006 | Robertson et al. |
| 2007/0286463 A1 | 12/2007 | Ritzau et al. |
| 2008/0016109 A1 | 1/2008 | Henkin et al. |
| 2008/0115104 A1 | 5/2008 | Quinn |
| 2011/0191211 A1 | 8/2011 | Lin |
| 2011/0307411 A1 | 12/2011 | Bolivar et al. |
| 2014/0053069 A1 | 2/2014 | Yan |
| 2015/0248405 A1 | 9/2015 | Rudich et al. |
| 2015/0319198 A1 | 11/2015 | Gupta et al. |
| 2016/0140221 A1 | 5/2016 | Park et al. |
| 2016/0164866 A1 | 6/2016 | Oberheide et al. |
| 2016/0314514 A1* | 10/2016 | High .................. G06Q 30/0631 |
| 2018/0341997 A1 | 11/2018 | Siddiqui et al. |

\* cited by examiner

OPTIMIZING DISPLAY OF DISCLOSURE BASED ON PRIOR INTERACTIONS

CROSS-REFERENCE TO RELATED PATENT APPLICATIONS

This application is a continuation of U.S. application Ser. No. 16/881,434 filed May 22, 2020, which is divisional of U.S. application Ser. No. 15/635,721, filed Jun. 28, 2017, the contents of each of such applications are incorporated herein by reference in their entirety.

BACKGROUND

The proliferation of the internet has fundamentally changed various aspects of individuals' lives, such as communication, work, education, finance, social and personal relationships, etc. For example, the internet has remarkably increased the amount of information available and decreased the transaction cost of obtaining such information. It has also enabled new ways to analyze information available to provide real time information related to accounts with businesses such as financial institutions. Disclosure documents are provided when accounts with financial institutions or financial instruments are obtained such as credit card accounts, loans, and the like. These disclosure documents provide important information about features of the accounts or financial instruments such as associated fees, penalties and interest rates. As a practical matter, these documents are often not read carefully by customers and account holders.

SUMMARY

In some embodiments, a computer-implemented method is described, performed by a computing system, for emphasizing a section of a document object. The method comprises receiving a request for first data comprising the document object, analyzing document interaction history of at least one of the document object and an account holder associated with the request, determining a section of a textual display of the document object to visually prioritize upon display based on the analysis of the document interaction history, updating the document object to visually prioritize upon display the determined section, and transmitting the first data comprising the document object to a computing device configured to display at least the section of the textual display of the document object. The method may also comprise receiving document interaction data of interaction with the document object and updating an interaction database based on the document interaction data. In some embodiments, updating the document object to visually prioritize upon display the determined section comprises updating a characteristic of the determined section selected from a group including highlighting, font size, font style, text color, animation, scrolling speed, and annotation. In some embodiments, updating the document object to visually prioritize upon display the determined section comprises adding a tag to the determined section. The tag may be configured to indicate to the computing device for the determined section at least one of an annotation is activated or a type of emphasis is activated.

In some embodiments, a computer-implemented method is described, performed by a computing system, for updating a section of a document object. The method comprises sending a document object to a computing device configured to communicate at least a section of the document object to a user of the computing device, receiving interaction data of the user of the computing device interacting with the sent document object, determining a change to the document object is needed based on the received interaction data, and sending an update to the document object consequent to determining the change to the document object is needed. In some embodiments, the document object is configured to communicate the at least the section of the document object to the user of the computing device by displaying textual data on a display of the computing device. In some embodiments, the document object is configured to communicate the at least the section of the document object to the user of the computing device by generating audio using a speaker operably connected to the computing device. Determining that the change to the document object is needed based on the received interaction data may comprise determining an association of the received interaction data of the user with the at least the section of the document object exceeds a predetermined threshold. In some embodiments, the update to the document object is configured to visually prioritize, upon display, the at least the section of the object with visual prioritization selected from a group including highlighting, font size, font style, text color, animation, scrolling speed, and annotation. In some embodiments, the update to the document object comprises adding a tag to the at least the section of the document object.

In some embodiments, a computer-implemented method is described, performed by a computing system, of pushing disclosure associated data to an account holder. The method comprises receiving first data comprising transaction information associated with a first account operating on a financial institution computing system and analyzing the first data associated with the first account. Analyzing the first data comprises predicting a financial instrument transfer from the first account and predicting a violation of a term of a disclosure associated with the financial instrument transfer. The method further comprises determining a section of the disclosure relevant to the violation of the term of the disclosure consequent to analyzing the first data associated with the first account and pushing second data associated with the section of the disclosure relevant to the violation of the term of the disclosure to a computing device associated with the first account. In some embodiments, the method further comprises pushing third data comprising a suggested query to the computing device associated with the first account based on the predicted violation of the term of the disclosure associated with the financial instrument transfer. In some embodiments, predicting the financial instrument transfer from the first account comprises analyzing a financial history associated with the first account to determine a plurality of financial instrument transfers from the first account associated with the financial instrument transfer from the first account exceeds a predetermined threshold and associating each of the plurality of financial instrument transfers from the first account associated with the financial instrument transfer from the first account with a respective calendar date. In some embodiments, predicting the violation of the term of the disclosure associated with the financial instrument transfer comprises predicting a financial instrument transfer determining a predicted account balance of the first account is below a predetermined threshold consequent to the predicted financial instrument transfer from the first account. In some embodiments, the method further comprises predicting a financial instrument transfer to the first account, wherein predicting the violation of the term of the disclosure associated with the financial instrument transfer comprises determining a predicted account balance of the first account is below a predetermined threshold consequent to the predicted financial instrument transfer from the first account and the predicted financial instrument transfer to the first account. In some embodiments, predicting the financial instrument transfer to the first account comprises analyzing a financial history associated with the first account to determine a plurality of financial instrument transfers to the first account associated with the financial instrument transfer to the first account exceeds a predetermined threshold and associating each of the plurality of financial instrument transfers from the first account associated with the financial instrument transfer from the first account with a respective calendar date. In some embodiments, the method further comprises receiving third data comprising a query from the computing device associated with the pushed second data; and pushing fourth data associated with a different section of the disclosure relevant to the query to the computing device associated with the first account. The method may further comprise pushing fifth data comprising a suggested query to the computing device associated with the first account based on the received query and the predicted violation of the term of the disclosure associated with the financial instrument transfer. In some embodiments, the second data is configured to communicate the section of the disclosure relevant to the violation of the term of the disclosure to a user of the computing device by generating audio using a speaker operably connected to the computing device.

In some embodiments, a computing device is described configured to execute instructions to perform one or more of the above methods. In some embodiments, a non-transitory computer-readable medium is described, comprising instructions, that when executed by a computing device, performs one or more of the above methods.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring generally to the figures, systems and methods for facilitating optimization of documents based on prior interactions according to one or more example embodiments are shown. Such systems and methods make use of analyzing information obtained from financial institution computing system as well as other third party system such as social media networks. Such systems and methods also make use of analyzing information stored from previous interactions with documents (e.g., financial disclosures). In some embodiments, this analysis of data allows for documents, such as disclosure documents, to emphasize features or sections that are of particular interest to the individual receiving the document. The features or sections may be selected based on the individual's previous interaction with the same or similar document. The features or section may also be selected based on the previous interactions of a plurality of individuals with the same or similar document. The plurality of individuals may be determined by a similarity to the individual receiving the document. Features or sections may be selected based on association or discussion of items such as associated fees, late fees, commission fees, penalties, interest rates, rate changes, good faith estimates, conflicts of interest, information related to FDIC protection, market factors, and the like.

In addition, embodiments described herein solve the technical problem of determining the appearance and functionality of a document (e.g., a document object comprising a document with interactive features) based on determining one or more sections or topics of the document based on a determined interest or need of the receiver of the document. The capability to determine the one or more sections or topics is addressed by leveraging an individual account holder's previous interaction data with the same or similar document objects. The capability may also be addressed by leveraging a plurality of individuals' interaction data with the same or similar document objects. The capability may also be addressed by leveraging transaction data as presented in one or more financial accounts and analyzing it to determine a predicted interest in one or more sections of a document object. By displaying the most desired and/or relevant information first, interaction time may be reduced as well as having efficient use of display space.

Further, embodiments described herein solve the technical and internet-centric problem of determining a change to a document is needed based on real-time interaction with the document. The capability to determine a change is needed is addressed by leveraging an individual account holder's previous interaction data with the same or similar document objects. The capability may also be addressed by leveraging a plurality of individuals' interaction data with the same or similar document objects. The capability may also be addressed by leveraging transaction data as presented in one or more financial accounts and analyzing it to determine a predicted need to emphasize one or more sections of the document object.

Further, embodiments described herein solve the technical and internet-centric problem of determining when data associated with a section of a document (e.g., a disclosure document) should be sent (i.e., pushed) to an account holder. Determining when a section should be pushed is addressed by leveraging financial transaction information and/or additional data associated with the account holder to predict a need for the information to be sent. Analysis of financial transaction information may be used to predict a need and a time to push data associated with a section of a document such as a disclosure document.

Further, embodiments described herein solve the technical and internet-centric problem of prioritizing data associated with a section of a document (e.g., a disclosure document) when the data is being accessed by an account holder or customer using a voice based system (e.g., Amazon Echo® system, Apple HomePod® system, Google Home® system, and the like). The customer can have a more natural interaction with the information in the document with certain sections determined to be more important based on data associated with the customer and communicated first by the system. Further voice interaction allows for repeating portions of the document or determining the next section of document to be communicated. By providing the most desired and/or relevant information first interaction time may be reduced, thus saving communication bandwidth and time.

Accordingly, analyzing previous interaction data as well as well as associated customer financial transaction data allows a financial institution to provide the customer with customized financial services based on the customer's needs and preferences, and allows the financial institution to predict or anticipate other customer's needs or preferences as well. As such, according to various embodiments, customer satisfaction and customer user experience are improved. In addition, by more precisely determining needs and anticipating future needs of a customer, the customer is less likely to make further requests (or instances of future requests may decrease from the customer) for financial services from the financial institution, thereby conserving computing resources of the customer and of the financial institution, and conserving network resources that are used to transmit requests and responses to requests between the customer and the financial institution (e.g., freeing up the network resources for other operations, and therefore providing reduced latency of the network). Furthermore, because the financial institution provides financial services (e.g., disclosure document information) that the customer needs, and omits services and information that may be irrelevant to the customer, the amount of information sent over a network is reduced such that network bandwidth is conserved. Furthermore, in the situation where a customer requests document and/or financial information, by transmitting and displaying only information that is pertinent to the customer and the customer's request (e.g., by omitting information that is not pertinent to the customer), the information at a user device can be more efficiently displayed from a display space perspective, thereby conserving display space at the user device. Accordingly, the embodiments described herein solve the technical and internet-centric problems of accurately and efficiently fulfilling requests for financial services and their associated documents by a financial institution.

Figure 1:
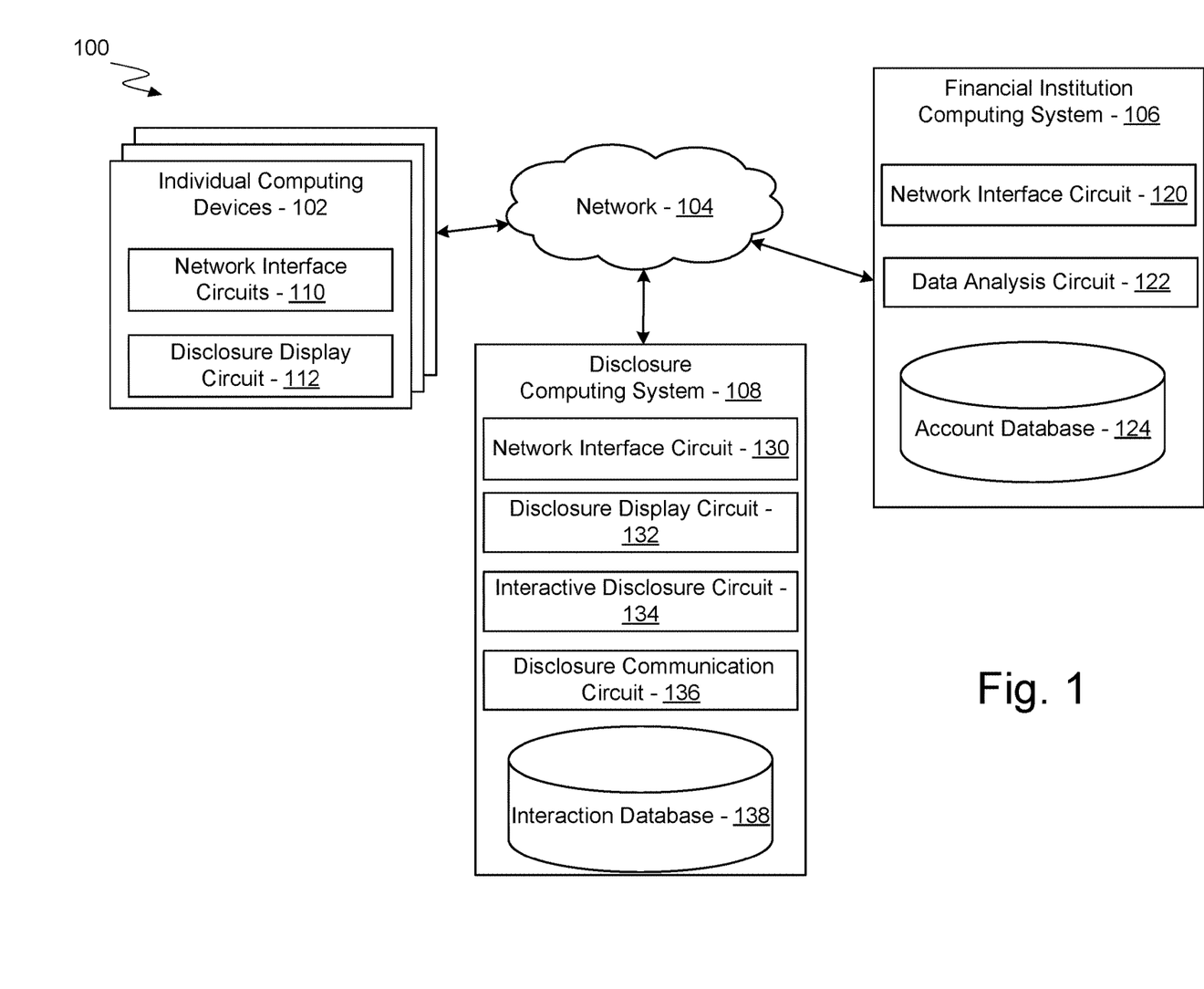
FIG. 1 is a block diagram of a system for facilitating optimization of documents based on prior interactions according to an example embodiment.

Referring now to FIG. 1, an embodiment of an environment 100 is depicted. In brief overview, the environment 100 includes one or more individual computing devices 102 used by users with financial accounts with financial institutions and connected to a network 104. Also connected to the network 104 is a financial institution computing system 106. The financial institution computing system 106 is affiliated with a financial institution, such as a bank. In some embodiments, the individual computing devices 102 communicate over the network 104 to the financial institution computing system 106. Also connected to the network 104 is a disclosure computing system 108. The disclosure computing system 108 may be one or more servers configured to facilitate methods for facilitating optimization of documents based on prior interactions. The individual computing devices 102 can be smartphones, laptop computers, tablet computers, e-readers, smartwatches, and the like. In reference to components described herein, references to the components in singular or in plural form are not intended as disclaimers of alternative embodiments unless otherwise indicated. The components are configured to interact, in some embodiments, as described in further detail below.

In the environment 100, data communication between the individual computing devices 102, the financial institution computing system 106, and/or the disclosure computing system 108. is facilitated by the network 104. In some embodiments, the network 104 includes the interne. In other embodiments or combinations, the network 104 includes a local area network or a wide area network. The network 104 is facilitated by short and/or long range communication technologies including Bluetooth® transceivers, Bluetooth® beacons, RFID transceivers, NFC transceivers, Wi-Fi transceivers, cellular transceivers, wired network connections (e.g., Ethernet), etc.

Still referring to FIG. 1, the individuals using individual computing devices 102 are in communication with and/or have accounts with a financial institution associated with the financial institution computing system 106. In some embodiments, individuals include single persons as well as households and families and may also include, companies, corporations, or other entities using the system(s) herein to maintain accounts with financial institutions and telecommunication companies. Individuals communicate via an individual computing device 102 over a respective network interface circuit 110 over the network 104 to a financial institution computing system 106 and/or a disclosure computing system 108. In some embodiments, individual computing devices 102 are mobile computing devices such as smartphones, laptop computers, tablet computers, e-readers, smartwatches, and the like. Data passing through the respective network interface circuits 110 can be encrypted such that the network interface circuit 110 is a secure communication module. The network 104 enables components of the system 100 to communicate with each other (e.g., the financial institution computing system 106 with the individual computing devices 102). The network 104 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some embodiments, the network 104 includes the internet.

The individual computing devices 102 are mobile computing systems configured to run applications and communicate with other computer systems over a network 104. For example, the individual computing device 102 is configured to allow a customer to view disclosure documents related to a given account with a financial institution using disclosure display circuits 112 (e.g., a circuit formed at least in part by an application associated with the financial institution and installed on the individual computing device 102). The individual computing devices 102 may be configured to run other applications allowing access to financial account balances or the transfer of funds from a given account with a financial institution. The individual computing devices 102 as depicted include network interface circuits 110. In some embodiments, the network interface circuits 110 comprise one or more Bluetooth® transceivers, RFID transceivers, NFC transceivers, Wi-Fi transceivers, cellular transceivers, and the like. In some embodiments, components of the individual computing devices 102 are connected by wired or wireless connections.

The disclosure display circuit 112 is configured to allow a customer to view disclosure documents related to a given account with a financial institution associated with a financial institution computing system 106. In some embodiments, the disclosure display circuit 112 comprises an application configured to allow interaction with a disclosure document object. The application is configured to allow interaction to request a definition of a word or phrase, request an annotated explanation, input a question, and the like. The application may be configured to track amount of time spent on a section of a displayed document, number of times a section is navigated to and/or viewed, a number of interactions with a section of a displayed document, and the like.

The financial institution computing system 106 is associated with a financial institution (e.g., a bank, a credit card issuer, etc.). In some embodiments, the financial institution computing system 106 includes a network interface circuit 120, a data analysis circuit 122, and an account database 124. The data analysis circuit 122 controls at least some operations of the financial institution computing system 106 using data stored in databases or other computer storage structures, such as the account database 124. The data analysis circuit 122 is configured to determine when financial transactions and/or customer related data predicts a need to push at least a portion of a disclosure to the customer. Data passing through the network interface circuit 120 is encrypted such that the network interface circuit 120 is a secure communication module. In some embodiments, the network interface circuit 120, the data analysis circuit 122, and the account database 124 reside in part on different servers in relation to other components or to the whole of a particular component.

In some embodiments, the data analysis circuit 122 is configured to determine when financial transactions and/or customer related data predicts a need to push at least a portion of a disclosure to the customer. The data analysis circuit 122 is configured to receive transaction information includes information associated with the account relevant to the financial health or status of the account holder, including any financial information described herein. In some embodiments, the data analysis circuit 122 is configured to receive transaction information based on an authorization or authentication by the account holder such that the data analysis circuit 122 is linked to one or more accounts as to be able to monitor the financial account(s) held by the account holder and pull transaction information. In some embodiments, the data analysis circuit 122 is configured to receive financial information, including historical transaction information, from other sources, including credit agencies, merchants, business partners, the account holder, social media computing systems and the like.

The data analysis circuit 122 is configured to analyze transaction information to identify a disclosure associated event. In some embodiments, the data analysis circuit 122 is configured to continually analyze transaction information as it becomes available. The data analysis circuit 122 may be configured to wait for a predetermined time (e.g., a day, a week, etc.) before analyzing any new transactions. In some embodiments, the data analysis circuit 122 waits for a predetermined time and/or waits for a triggering event, such as a new transaction associated with the account, before analyzing any new transactions. The data analysis circuit 122 can be configured to analyze a previous predetermined time period to determine any disclosure associated events. Analysis may comprise determining recurring and/or predictable deposits or withdrawals of financial instruments (e.g., direct deposit of a paycheck, social security payment, annuity payment, mortgage payment, credit card payments, etc.) For example, an event can be a predicted inability to complete a recurring financial transaction in an account of a customer. The data analysis circuit 122 can be configured to calculate a probability regarding a future failure to abide by the terms of an active financial disclosure agreement. Events may also be triggered unrelated to financial transactions of the customer. For example, there may be a change in law that effects the terms or liability arising from a financial disclosure agreement, and the relevant section is pushed to the customer along with an explanation.

In some embodiments, the data analysis circuit 122 is configured to calculate a disclosure push rating for an account holder with accounts with associated financial disclosure documents. The disclosure push rating may be based on a prediction of when one or more terms in the financial disclosure document may take affect (e.g., a penalty fee, interest rate rise, etc.). The disclosure push rating may be weighted using one or more parameters such as type of account, a financial health of the account holder, a risk factor of violation of one or more terms of a financial disclosure, third party data indicating a predicted violation of one or more terms of a financial disclosure and the like. In some embodiments, the data analysis circuit 122 is configured to use a disclosure push rating to weight whether a disclosure associated event (e.g., a predicted action or result that is associated with a financial disclosure) is predicted to occur.

The data analysis circuit 122 is configured to determine if a disclosure related event has been identified. In some embodiments, the data analysis circuit 122 is configured to make the determination based on the analysis of the transaction information. The data analysis circuit 122 is configured to determine a section of a disclosure relevant to the event if a disclosure related event is identified. The data analysis circuit 122 can be configured to use additional data in the determination, such as historical document interaction data and the like. For example, the customer has previous historical interaction information indicating an interest in the particular section of the document affected by the event. The particular section may be weighted higher in events that may affect more than one section of a disclosure document and the particular section may be more likely to be determined as a section of the disclosure relevant to the event.

The data analysis circuit 122 is configured to push data associated with a section relevant to a disclosure related event to an account holder associated with an account. The data may comprise a portion of the section or an associated explanation of the section of a disclosure document. The data can be sent through an application, as an attachment to an email, a text message, or other path of communication to the account holder. In some embodiments, the data analysis circuit 122 is configured to send a paraphrase or natural language version of the data. The paraphrased version may be accompanied by a link or other method of accessing the full text of the section referenced. The version of the text may be based on previous interactions with the account holder and/or an indicated preference. The data can be accompanied by additional information on how to solve the predicted difficulty. The data can be accompanied by a proposed change in an agreement that is covered by the disclosure agreement to help solve any predicted need or problem. In some embodiments, the data analysis circuit 122 is configured to make a further threshold determination whether to push the data associated with the section to the account holder associated with the account. A further threshold determination (or an initial go or no-go determination) may be based on a history of the account holder attempting to head off or mitigate problems with their account, previous interaction history of the account holder showing a threshold interest in interacting with a disclosure document, and the like.

In some embodiments, the account database 124 is configured to store information related to account information (e.g., account numbers, account types, account balances, transaction history, ownership information, owner contact information, etc.) and/or profiles of individuals using the disclosure computing system 108. Historical financial transaction information between one or more individuals may be stored in the account database 124.

The disclosure computing system 108 is a computing system configured to run applications and other software and communicate with other computing systems over a network 104. In some embodiments, the disclosure computing system 108 is a server. In some embodiments, the disclosure computing system 108 includes a network interface circuit 130, a disclosure display circuit 132, an interactive disclosure circuit 134, a disclosure communication circuit 136, and an interaction database 138. The network interface circuit 130 comprises one or more Bluetooth® transceivers, RFID transceivers, NFC transceivers, Wi-Fi transceivers, cellular transceivers, and the like. The disclosure display circuit 132, the interactive disclosure circuit 134, the disclosure communication circuit 136, and the interaction database 138 may reside in part on different computing devices or systems (e.g., in the financial computing system 106) in relation to other components or to the whole of a particular component. Data passing through the network interface circuit 130 may be encrypted such that the network interface circuit 130 is a secure communication module.

In some embodiments, the disclosure display circuit 132 is configured to receive a request for a document. The document is associated with an account held with a financial institution associated with the financial institution computing system 106. In some embodiments, the document is a disclosure document. The disclosure document may be associated with a transaction of an account holder of the account involving receiving or sending financial instruments. The disclosure document may be a sample disclosure document associated with a potential and/or imminent transaction or agreement. The disclosure document can be integrated in to a disclosure object with one or more interactive features when displayed to a customer. Interactive features may include question input capability, word or phrase definition lookup, annotated explanation of one or more sections of the document, links to connect to further help or explanation related to the document, and the like. Annotated portions of a disclosure may comprise sections tagged with specific events of interest where the tags are activated and the annotations are revealed when it is determined that those events have occurred.

The disclosure display circuit 132 is configured to determine whether associated data is available for the disclosure document. Associated data may be one or more of previous interaction data with the requested document and/or other documents (e.g., other disclosure documents). Associated data may also be transaction data associated with the requestor of the document. The previous interaction data may be from an account holder requesting the document previously interacting with the same requested document, from an account holder requesting the document previously interacting with a different requested document (e.g., a different disclosure object), from a different account holder associated with the same requested document, from a different account holder associated with a different document (e.g., a different disclosure object), a plurality of account holders associated with the same document, and/or a plurality of account holders associated with a different document (e.g., a different disclosure object). Interaction data may comprise time spent on a section of the document, navigation to or renavigation to a section of the document, a number of times a section of the document has been navigated to, interaction with a section of the document (requesting a definition, requesting an annotated explanation, inputting a question, etc.), and the like. Transaction data comprises financial transaction data associated with one or more accounts associated with the requestor of the document. Financial transaction data may comprise recurring deposits and withdrawals from an account, other transaction history of financial products, credit scores, liquid asset positions, liquidity ratio (e.g., liquid assets/monthly expenses), asset to debt ratio (e.g., total assets/total liabilities), current ratio (e.g., liquid assets/short term liabilities), debt service ratio (e.g., short term liabilities/total income), saving ratio (e.g., monthly surplus once recurring liabilities paid), set monthly costs, expenditure volatility, and the like.

The disclosure display circuit 132 is configured to analyze associated data, if available, to determine one or more document sections to prioritize. In some embodiments, the disclosure display circuit 132 is configured to select an initial base document determined by the type of document needed (e.g., due to geographic differences, state and/or even city based on local law). One or more document sections may comprise sections, sub-sections, pages, paragraphs, appendixes, and the like. The disclosure display circuit 132 is configured to prioritize one or more document sections based on if a change to document appearance is determined. A change to document appearance may comprise annotation with further description, highlighting, pop-up text boxes with explanation, font size differences, font style differences, color changes, animation, a change in scrolling speed, haptic feedback, and the like. Two or more changes to document appearance can also be used together for additional prioritization and/or emphasis.

The disclosure display circuit 132 is configured to emphasize one or more sections of the document if one or more sections are identified along with a change to document appearance. In some embodiments, the document is a document object. Emphasis may comprise section specific annotation with further description, highlighting, pop-up text boxes with explanation, a change in document presentation order, guided navigation of the document, a separate acknowledgment of the section, font size differences, font style differences, color changes, animation, haptic feedback, and the like. Certain sections may require separate acknowledgment by the customer. The sections may also have a viewing requirement of a predetermined amount of time before the disclosure can be acknowledged or agreed to. In some embodiments, disclosure display circuit 132 is configured to add a tag to the one or more sections identified. The tag may indicate that annotations are turned on for the section, one more types of emphasis is turned on for the section, or other types of emphasis of the section when the document is displayed. The device and/or application being used to access the document can change how the emphasis is accomplished. For example, access to the document could be through speech to text software and the emphasis relies on changing the order of the sections or audio annotations.

In some embodiments, the interactive disclosure circuit 134 is configured to receive document interaction data. The interaction data is created consequent to interaction by the requestor of the document with the document (e.g., a disclosure document). The interactive disclosure circuit 134 may also be configured to receive data associating the received interaction data with an account holder and an identifier of the document being interacted with. Interaction data may include time spent on a section of the document, navigation to or renavigation to a section of the document, a number of times a section of the document has been navigated to, interaction with a section of the document (requesting a definition, requesting an annotated explanation, inputting a question, etc.), and the like. Interaction may also include requesting a contact at the financial institution (e.g., clicking on a link to initiate communication) for more help. Interaction may also include inputting a question, word or phrase definition lookup, activating an annotated explanation of one or more sections of the document, document interactions that activate tags linked to one or more sections of the document, activating a link to connect to further help or explanation related to the document, and the like.

The interactive disclosure circuit 134 is configured to update interaction data. In some embodiments, the interaction data is updated in a database (e.g., interaction database 138). The interactive disclosure circuit 134 is configured to associate the interaction data in the database with the requestor of the document. The interactive disclosure circuit 134 may also be configured to associate the interaction data with a plurality of account holders that are similar to the requestor of the document. Similarity of account holders may be based on demographics information, location, occurrence of significant life events (e.g., marriage, childbirth, divorce, job change, etc.), and the like. In some embodiments, similar account holders are based on a social networking profile of the account holder, including based on listed interests in social profiles, social profile activity, number of social connections, number of followers, etc. document interaction data is received.

The interactive disclosure circuit 134 is configured to determine if a change to the document is needed. In some embodiments, the interactive disclosure circuit 134 is configured to make the determination based on the received document interaction data. The interactive disclosure circuit 134 is configured to send an update to the document object (e.g., using the disclosure communication circuit 136), if an update is needed. Additional data may be used in the determination such as historical document interaction data, financial transaction data, and the like.

The disclosure communication circuit 136 is configured to send the document. In some embodiments, the document (e.g., a disclosure document) is a document object. A document object may comprise a document with interactive features. In some embodiments, a specialized application is used to interact with the document object. Interactive features can include one or more of question input capability, word or phrase definition lookup, annotated explanation of one or more sections of the document, links to connect to further help or explanation related to the document, and the like. Annotated portions of a disclosure may comprise sections tagged with specific events of interest where the tags are activated and the annotations are revealed when it is determined that those events have occurred.

The disclosure communication circuit 136 is configured to send an update to the document object upon a determination that a change to the document object is needed. A change may comprise annotation with further description, highlighting, pop-up text boxes with explanation, font size differences, font style differences, color changes, animation, a change in scrolling speed, haptic feedback, and the like. A change may also comprise sending a suggested question to ask based on the interaction with the document. Suggested questions to ask may be based on questions asked or input by the customer in to the document object. Suggested questions may be determined based on historical follow up questions associated with the question input by the customer. Suggested question may also be determined based on additional information based on analyzing financial transaction information associated with the customer and determining a predicted relevant concept associated with the disclosure document.

In some embodiments, the interaction database 138 is configured to store information related to interactions of account holders or potential account holders of a financial institution to a disclosure document object. The interaction database 138 can be configured in different ways including correlating interactions to individual account holders, correlating interactions to groups comprising a plurality of account holders. Groups may be determined by demographics, location, shared interests, social media activity, financial fitness, financial health, and the like. The analysis of financial transaction history may indicate one or more parameters of financial health of the account holder evaluated to predict a need to push a section of a disclosure based on a disclosure associated event. In some embodiments, other data are analyzed such as social media associated with account holder. The analysis of data from social media may provide a further indicator of the financial health of the account holder, major life events, and the like.

Figure 2:
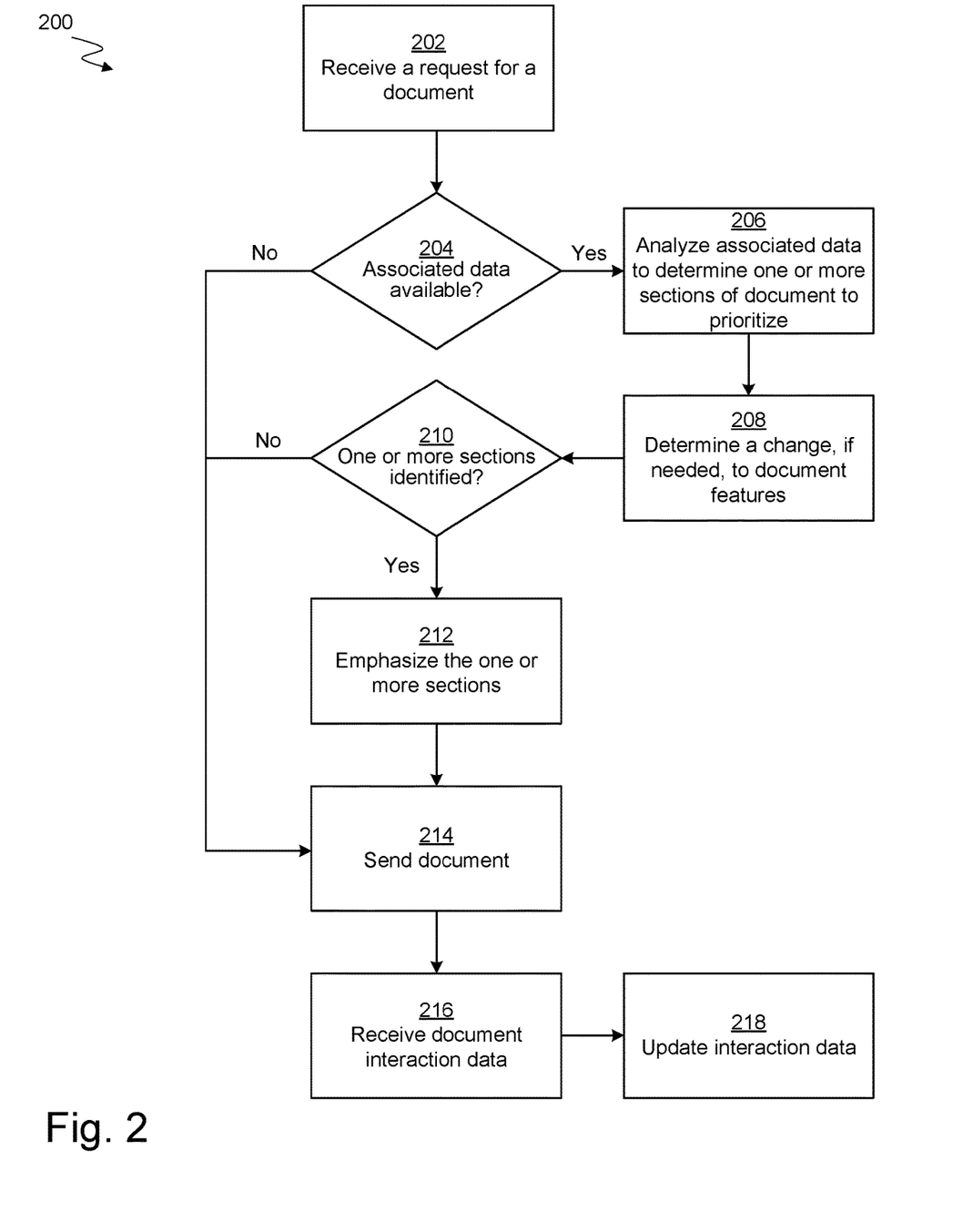
FIG. 2 is a flow diagram of a method of determining an appearance of a document according to an example embodiment.

Referring now to FIG. 2, a flow diagram of a method 200 of determining an appearance of a document is depicted according to an example embodiment. In some embodiments, the method 200 is performed by a computing system (e.g., a disclosure computing system 108) using data queried from a database (e.g., interaction database 138). While performing the method 200, the disclosure computing system 108, for example, communicates data over a network interface circuit 130 over the network 104 to an individual computing device 102. In brief, method 200 comprises receiving a request for a document (e.g., a disclosure document), determining if associated data is available, and if not, sending a document object. After sending the document object, document interaction data may be received which is used to update the interaction data associated with the document and/or the requestor. If associated data is available, the associated data is analyzed to determine one or more sections of the document to prioritize and determine a change, if needed, to document appearance. If one or more sections of the document to prioritize is determined, then one or more sections of the document is emphasized in the document object before it is sent. Interaction data may include, time spent on a section of the document, navigation to or renavigation to a section of the document, a number of times a section of the document has been navigated to, interaction with a section of the document (requesting a definition, requesting an annotated explanation, inputting a question, etc.), and the like.

Continuing with FIG. 2 and in more detail, the method 200 begins when a request for a document is received at 202. In some embodiments, the document is associated with an account held with a financial institution associated with the financial institution computing system 106. In some embodiments, the document is a disclosure document. The disclosure document may be associated with a transaction of an account holder of the account involving receiving or sending financial instruments. The disclosure document may be a sample disclosure document associated with a potential and/or imminent transaction or agreement. The disclosure document can be integrated in to a disclosure object with one or more interactive features when displayed to a customer. Interactive features may include question input capability, word or phrase definition lookup, annotated explanation of one or more sections of the document, links to connect to further help or explanation related to the document, and the like. Annotated portions of a disclosure may comprise sections tagged with specific events of interest where the tags are activated and the annotations are revealed when it is determined that those events have occurred. In some embodiments, the document is a document object configured to be communicated to a customer or account holder using a voice-based system.

At 204, it is determined whether associated data is available. Associated data may be one or more of previous interaction data with the requested document and/or other documents (e.g., other disclosure documents). Associated data may also be transaction data associated with the requestor of the document. The previous interaction data may be from an account holder requesting the document previously interacting with the same requested document, from an account holder requesting the document previously interacting with a different requested document (e.g., a different disclosure object), from a different account holder associated with the same requested document, from a different account holder associated with a different document (e.g., a different disclosure object), a plurality of account holders associated with the same document, and/or a plurality of account holders associated with a different document (e.g., a different disclosure object). Interaction data may comprise time spent on a section of the document, navigation to or renavigation to a section of the document, a number of times a section of the document has been navigated to, interaction with a section of the document (requesting a definition, requesting an annotated explanation, inputting a question, etc.), and the like. Transaction data comprises financial transaction data associated with one or more accounts associated with the requestor of the document. Financial transaction data may comprise recurring deposits and withdrawals from an account, other transaction history of financial products, credit scores, liquid asset positions, liquidity ratio (e.g., liquid assets/monthly expenses), asset to debt ratio (e.g., total assets/total liabilities), current ratio (e.g., liquid assets/short term liabilities), debt service ratio (e.g., short term liabilities/total income), saving ratio (e.g., monthly surplus once recurring liabilities paid), set monthly costs, expenditure volatility, and the like.

If it is determined that associated data is available, the associated data is analyzed to determine one or more document sections to prioritize at 206. In some embodiments, an initial base document is selected determined by the type of document needed (e.g., geographic differences, state and/or even city based on local law). One or more document sections may comprise sections, sub-sections, pages, paragraphs, appendixes, and the like. If a change to document features is determined in order to prioritize one or more document sections, a change to document features is determined at 208. A change to document features may comprise annotation with further description, highlighting, pop-up text boxes with explanation, font size differences, font style differences, color changes, animation, a change in scrolling speed, haptic feedback, and the like. In some embodiments, where the document is an audio document object, document features may comprise an increase in volume, tonal emphasis, pauses between sections, altered vocal pitch, the addition of audio notes or annotation, and the like. Two or more changes to document features can also be used together for additional prioritization and/or emphasis.

If one or more sections are identified along with a change to document appearance, one or more sections of the requested document is emphasized at 212. In some embodiments, the document is a document object. Emphasis may comprise section specific annotation with further description, highlighting, pop-up text boxes with explanation, a change in document presentation order, guided navigation of the document, a separate acknowledgment of the section, font size differences, font style differences, color changes, animation, haptic feedback, and the like. Certain sections may require separate acknowledgment by the customer. The sections may also have a viewing requirement of a predetermined amount of time before the disclosure can be acknowledged or agreed to. In some embodiments, a tag is added to the one or more sections identified. The tag may indicate that annotations are turned on for the section, one more types of emphasis is turned on for the section, or other types of emphasis of the section when the document is displayed. The device and/or application being used to access the document can change how the emphasis is accomplished. For example, access to the document could be through speech to text software and the emphasis relies on changing the order of the sections or audio annotations. In some embodiments, where the document is an audio document object, document emphasizing may comprise, altering the order of sections being read, increase in volume, tonal emphasis, pauses between sections, altered vocal pitch, the addition of audio notes or annotation, and the like.

The document is sent at 214. In some embodiments, the document (e.g., a disclosure document) is a document object. A document object may comprise a document with interactive features. In some embodiments, a specialized application is used to interact with the document object. Interactive features can include one or more of question input capability, word or phrase definition lookup, annotated explanation of one or more sections of the document, links to connect to further help or explanation related to the document, and the like. Annotated portions of a disclosure may comprise sections tagged with specific events of interest where the tags are activated and the annotations are revealed when it is determined that those events have occurred. In some embodiments, interaction is by natural language voice recognition.

Document interaction data is received at 216. The interaction data is created consequent to interaction by the requestor of the document with the document (e.g., a disclosure document). Data may also be received associating the received interaction data with an account holder and an identifier of the document being interacted with. Interaction data may include time spent on a section of the document, navigation to or renavigation to a section of the document, a number of times a section of the document has been navigated to, interaction with a section of the document (requesting a definition, requesting an annotated explanation, inputting a question, etc.), and the like. Interaction may also include requesting a contact at the financial institution (e.g., clicking on a link to initiate communication) for more help. Interaction may also include inputting a question, word or phrase definition lookup, activating an annotated explanation of one or more sections of the document, document interactions that activate tags linked to one or more sections of the document, activating a link to connect to further help or explanation related to the document, and the like.

Interaction data is updated at 218. In some embodiments, the interaction data is updated in a database (e.g., interaction database 138). The interaction data is associated in the database with the requestor of the document. The interaction data may also be associated with a plurality of account holders that are similar to the requestor of the document. Similarity of account holders may be based on demographics information, location, occurrence of significant life events (e.g., marriage, childbirth, divorce, job change, etc.), and the like. In some embodiments, similar account holders are based on a social networking profile of the account holder, including based on listed interests in social profiles, social profile activity, number of social connections, number of followers, etc.

Figure 3:
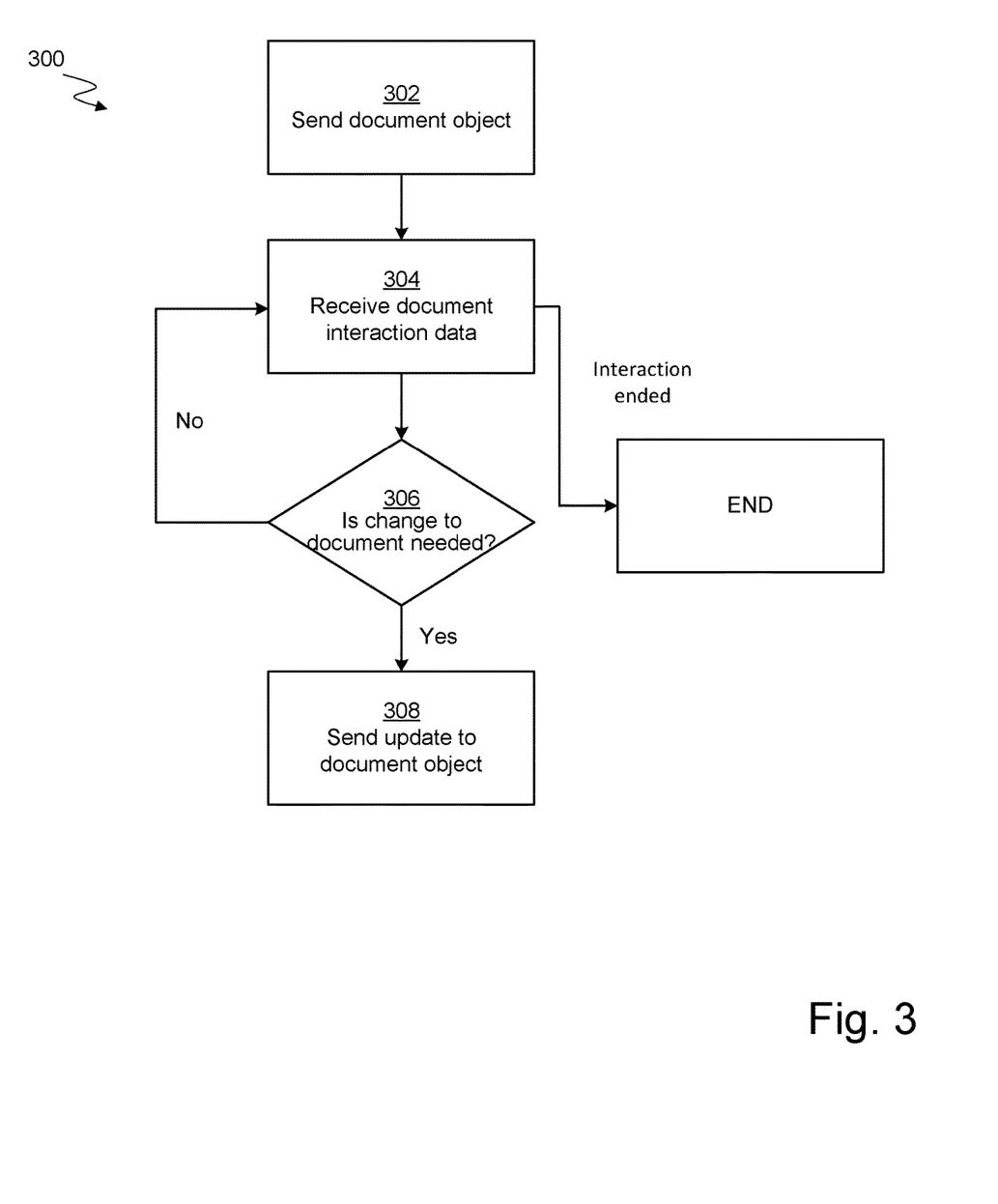
FIG. 3 is a flow diagram of a method of updating a document object based on interaction with the document object according to an example embodiment.

Referring now to FIG. 3, a flow diagram of a method 300 of determining an appearance of a document is depicted according to an example embodiment. In some embodiments, the method 300 is performed by a computing system (e.g., a disclosure computing system 108) using data queried from a database (e.g., interaction database 138). In some embodiments, one or more steps of the method 300 are performed by an application executing on an individual computing device 102 (e.g., by a disclosure display circuit 112). While performing the method 300, the disclosure computing system 108, for example, communicates data over a network interface circuit 130 over the network 104 to an individual computing device 102. In brief, method 300 comprises sending a document object (e.g., a disclosure document object), receiving document interaction data associated with the document object, and determining if a change to the document object is needed based on the interaction data. If no change to the document is needed, the method returns to receiving subsequent document interaction data associated with the document object. If a change is needed to the document, an update to the document object is sent. If interaction with the document object has ended, the method also ends.

Continuing with FIG. 3 and in more detail, the method 300 begins when a document object is sent at 302. In some embodiments, a document object comprises document data (e.g.,. data of a disclosure document). Document objects may also comprise interactive features. In some embodiments, a specialized application is used to interact with the document object. Interactive features can include one or more of question input capability, word or phrase definition lookup, annotated explanation of one or more sections of the document, links to connect to further help or explanation related to the document, and the like. Annotated portions of a disclosure may comprise sections tagged with specific events of interest where the tags are activated and the annotations are revealed when it is determined that those events have occurred.

At 304, document interaction data is received. Document interaction comprises data associated with a user of an individual computing device 102 viewing and interacting with the sent document object. Document interactions may comprise time spent on a section of the document, navigation to or renavigation to a section of the document, a number of times a section of the document has been navigated to, interaction with a section of the document (requesting a definition, requesting an annotated explanation, inputting a question, etc.), and the like. Interaction may also include requesting a contact at the financial institution (e.g., clicking on a link to initiate communication) for more help. Interaction may also include inputting a question, word or phrase definition lookup, activating an annotated explanation of one or more sections of the document, document interactions that activate tags linked to one or more sections of the document, activating a link to connect to further help or explanation related to the document, and the like. In some embodiments, interaction is by natural language voice recognition. If no document interaction data is received or interaction with the document object is ended, the method also ends.

A determination is made if a change to the document is needed at 306. In some embodiments, the determination is made based on the received document interaction data. If no change to the document is needed, the method returns to receiving subsequent document interaction data associated with the document object. If a change is needed to the document, an update to the document object is sent at 308. Additional data may be used in the determination such as historical document interaction data, financial transaction data, and the like.

If it is determined that a change to the document is needed, an update to the document object is sent at 308. A change may comprise annotation with further description, highlighting, pop-up text boxes with explanation, font size differences, font style differences, color changes, animation, a change in scrolling speed, haptic feedback, and the like. A change may also comprise sending a suggested question to ask based on the interaction with the document. Suggested questions to ask may be based on questions asked or input by the customer in to the document object. Suggested questions may be determined based on historical follow up questions associated with the question input by the customer. Suggested question may also be determined based on additional information based on analyzing financial transaction information associated with the customer and determining a predicted relevant concept associated with the disclosure document.

Figure 4:
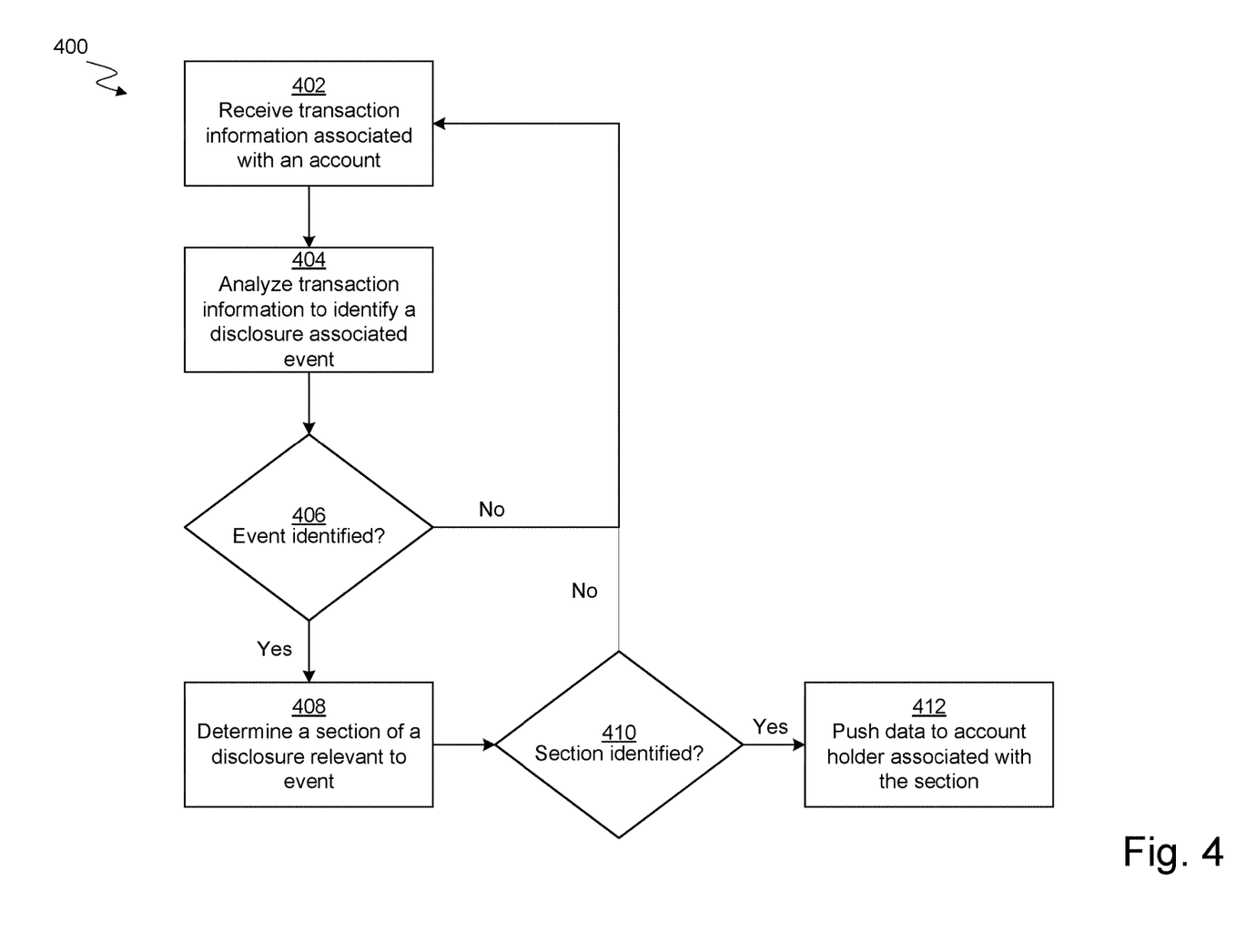
FIG. 4 is a flow diagram of pushing a section of a disclosure document to a customer according to an example embodiment.

Referring now to FIG. 4, a flow diagram of a method 400 of pushing a section of a disclosure document to a customer according to an example embodiment is depicted. In some embodiments, the method 400 is performed by a computing system (e.g., a disclosure computing system 108). In some embodiments, one or more steps of the method 400 are performed by a financial institution computing system 106 (e.g., by a data analysis circuit 122 using data retrieved from an account database 124). While performing the method 400, the disclosure computing system 108 and/or financial institution computing system 106, for example, communicates data over a network interface circuit 120 and/or a network interface circuit 130 over the network 104 to an individual computing device 102. In brief, method 400 comprises receiving transaction information associated with an account, analyzing transaction information to identify a disclosure associated event (i.e., an event associated with a disclosure), and if an event is identified, determining a section of the identified disclosure relevant to the event. If a section is identified, then data associated with the section is pushed to the account holder (e.g., to an individual computing device 102 associated with the account holder). If no event is identified or if no section is identified, the method returns to receiving transaction information associated with the account.

Continuing with FIG. 4 and in more detail, the method 400 begins when transaction information associated with an account is received at 402. In some embodiments, transaction information includes information associated with the account relevant to the financial health or status of the account holder, including any financial information described herein. In some embodiments, the transaction information is received from a financial institution that provides a financial account to the user (e.g., financial institution computing system 108). In some embodiments, the transaction information is received by the data analysis circuit 122 from an account database 124 of a financial institution computing system 106. In some embodiments, the transaction information is received based on an authorization or authentication by the account holder such that one or more components of the financial institution computing system 106 is linked to one or more accounts of the account holder such that the financial institution computing system 106 is able to monitor the financial account(s) held by the account holder and pull any information required to use in the method. In some embodiments, financial information, including historical transaction information, is also received from other sources, including credit agencies, merchants, business partners, the account holder, social media computing systems and the like.

The transaction information is analyzed to identify a disclosure associated event at 404. In some embodiments, transaction information is continually analyzed. In some embodiments, the method may wait for a predetermined time (e.g., a day, a week, etc.) before analyzing any new transactions in the method. In some embodiments, the method may wait for a predetermined time and also wait for a triggering event, such as a new transaction associated with the account, before analyzing any new transactions in the method. In some embodiment where the method waits for a predetermined time, when the method restarts at 402, all transactions during the time period of the predetermined time are analyzed to determine any disclosure associated events. Analysis may comprise determining, in some embodiments, recurring and/or predictable deposits or withdrawals of financial instruments (e.g., direct deposit of a paycheck, social security payment, annuity payment, mortgage payment, credit card payments, etc.) For example an event can be a predicted inability to complete a recurring financial transaction in an account of a customer. A probability may be calculated regarding a future failure to abide by the terms of an active financial disclosure agreement. Events may also be triggered unrelated to financial transactions of the customer. For example, there may be a change in law that effects the terms or liability arising from a financial disclosure agreement, and the relevant section is pushed to the customer along with an explanation.

In some embodiments, a disclosure push rating is calculated for an account holder with accounts with associated financial disclosure documents. The disclosure push rating may be based on a prediction of when one or more terms in the financial disclosure document may take affect (e.g., a penalty fee, interest rate rise, etc.). The disclosure push rating may be weighted using one or more parameters such as type of account, a financial health of the account holder, a risk factor of violation of one or more terms of a financial disclosure, third party data indicating a predicted violation of one or more terms of a financial disclosure and the like. In some embodiments, a disclosure push rating may be used to weight whether a disclosure associated event (e.g., a predicted action or result that is associated with a financial disclosure) is predicted to occur.

A determination is made if an event has been identified at 406. In some embodiments, the determination is made based on the analysis of the transaction information. If no event is identified, the method returns to receiving transaction information associated with an account at 402. If an event is identified, a section of a disclosure relevant to the event is determined at 408. If a determination is made at 410 that a section has not been identified, the method returns to receiving transaction information associated with an account at 402. Additional data may be used in the determination such as historical document interaction data and the like. For example, the customer has previous historical interaction information indicating an interest in the particular section of the document affected by the event. The particular section may be weighted higher in events that may affect more than one section of a disclosure document and the particular section may be more likely to be determined as a section of the disclosure relevant to the event.

If a determination is made at 410 that a section has been identified, data associated with the section is pushed to an account holder associated with the account at 412. The data may comprise a portion of the section or an associated explanation of the section of a disclosure document. The data can be sent through an application, as an attachment to an email, a text message, an auditory alert through a voice-based system, or other path of communication to the account holder. In some embodiments, a paraphrase or natural language version of the data is sent. The paraphrased version may be accompanied by a link or other method of accessing the full text of the section referenced. The version of the text may be based on previous interactions with the account holder and/or an indicated preference. The data can be accompanied by additional information on how to solve the predicted difficulty. The data can be accompanied by a proposed change in an agreement that is covered by the disclosure agreement to help solve any predicted need or problem . . . . In some embodiments, a further threshold determination may be made whether to push the data associated with the section to the account holder associated with the account. A further threshold determination (or an initial go or no-go determination) may be based on a history of the account holder attempting to head off or mitigate problems with their account, previous interaction history of the account holder showing a threshold interest in interacting with a disclosure document, and the like.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A computer-implemented method of pushing disclosure to an account holder, the method comprising:
    receiving, by one or more processors, a request for first data comprising a first account from a computing device; and
    identifying, by the one or more processors in response to the request, a financial history of the first account operating on a financial institution computing system;
    determining, by the one or more processors, based on the financial history, a plurality of financial instrument transfers to the first account exceeds a predetermined threshold;
    associate, by the one or more processors, each financial instrument transfer of the determined plurality of financial instrument transfers with a respective calendar date;
    predict a financial instrument transfer based on the determined plurality of financial instrument transfers;
    predicting, by the one or more processors, a violation of a term of a disclosure related with the predicted financial instrument transfer based on a predicted account balance related to the first account being below the predetermined threshold consequent to the predicted financial instrument transfer from the first account;

determining, by the one or more processors, a section of the disclosure relevant to the predicted violation of the term of the disclosure consequent to analyzing the first data associated with the first account; and transmitting, by the one or more processors, based on the section of the disclosure relevant to the predicted violation of the term of the disclosure, data to a computing device related with the first account to visually prioritize upon display the determined section of the disclosure, wherein the data comprise a query to update the first account based on the predicted violation of the term of the disclosure associated with the financial instrument transfer.

2. The computer-implemented method of claim 1, further comprising predicting, by the one or more processors, the predicted financial instrument transfer from the first account based on association of a plurality of financial instruments transfers to the first account and a respective calendar date.

3. The computer-implemented method of claim 2, wherein the predicted financial instrument transfer comprises a predicted amount, a predicted transfer date, and a predicted recipient, and wherein the predicted amount, the predicted transfer date, and the predicted recipient are determined based on the financial history of the first account.

4. The computer-implemented method of claim 1, further comprising determining, by the one more processors, the predicted account balance based on a current account balance and an amount associated with the predicted financial instrument transfer from the first account.

5. The computer-implemented method of claim 4, wherein determining the predicted account balance further comprises determining, by the one or more processors, the predicted account balance based on the current account balance, a first amount associated with the predicted financial instrument transfer from the first account, and a second amount associated with a predicted financial instruction transfer to the first account.

6. The computer-implemented method of claim 1, further comprising transmitting, by the one or more processors, data comprising a suggested query to the computing device associated with the first account based on the predicted violation of the term of the disclosure associated with the financial instrument transfer.

7. The computer-implemented method of claim 1, further comprising:
receiving, by the one or more processors, a query from the computing device associated with transmitted data related with the section of the disclosure; and
transmitting, by the one or more processors, data associated with a different section of the disclosure relevant to the query to the computing device associated with the first account.

8. The computer-implemented method of claim 1, wherein the data transmitted to the computing device is configured to communicate the section of the disclosure relevant to the violation of the term of the disclosure to a user of the computing device by generating audio using a speaker operably connected to the computing device.

9. The computer-implemented method of claim 1, further comprising:
receiving, by the one or more processors, first data comprising transaction information related with the first account;
analyzing, by the one or more processors, the first data to predict the financial instrument transfer from the first account;
pushing, by the one or more processors, second data related to the portion of the disclosure relevant to the violation of the term of the disclosure to the computing device;
receiving, by the one or more processors, a query from the computing device based on the second data; and
pushing, by the one or more processors, third data related to a second portion of the disclosure relating to the query from the computing device.

10. A system for pushing disclosure to an account holder, the system comprising: one or more servers comprising one or more processors configured to:
receive a request for first data comprising a first account from a computing device;
identify, in response to the request, a financial history of the first account operating on a financial institution computing system;
determine, based on the financial history, a plurality of financial instrument transfers to the first account exceeds a predetermined threshold;
associate each financial instrument transfer of the determined plurality of financial instrument transfers with a respective calendar date;
predict a financial instrument transfer based on the determined plurality of financial instrument transfers;
predict a violation of a term of a disclosure related with the predicted financial instrument transfer based on a predicted account balance related to the first account being below the predetermined threshold consequent to the predicted financial instrument transfer from the first account;
determine a section of the disclosure relevant to the predicted violation of the term of the disclosure consequent to analyzing the first data associated with the first account; and
transmit, based on the section of the disclosure relevant to the predicted violation of the term of the disclosure, data to a computing device related with the first account to visually prioritize upon display the determined section of the disclosure, wherein the data comprise a query to update the first account based on the predicted violation of the term of the disclosure associated with the financial instrument transfer.

11. The system of claim 10, wherein the one or more processors are further configured to predict the predicted financial instrument transfer from the first account based on association of a plurality of financial instruments transfers to the first account and a respective calendar date.

12. The system of claim 11, wherein the predicted financial instrument transfer comprises a predicted amount, a predicted transfer date, and a predicted recipient, and wherein the predicted amount, the predicted transfer date, and the predicted recipient are determined based on the financial history of the first account.

13. The system of claim 10, wherein the one or more processors are further configured to determine the predicted account balance based on a current account balance and an amount associated with the predicted financial instrument transfer from the first account.

14. The system of claim 13, wherein to determine the predicted account balance, the one or more processors are configured to determine the predicted account balance based on the current account balance, a first amount associated with the predicted financial instrument transfer from the first account, and a second amount associated with a predicted financial instruction transfer to the first account.

15. The system of claim 10, wherein the one or more processors are further configured to transmit data comprising a suggested query to the computing device associated with the first account based on the predicted violation of the term of the disclosure associated with the financial instrument transfer.

16. The system of claim 10, wherein the one or more processors are further configured to:
    receive a query from the computing device associated with transmitted data related with the section of the disclosure; and
    transmit data associated with a different section of the disclosure relevant to the query to the computing device associated with the first account.

17. The system of claim 10, wherein the data transmitted to the computing device is configured to communicate the section of the disclosure relevant to the violation of the term of the disclosure to a user of the computing device by generating audio using a speaker operably connected to the computing device.

18. The system of claim 10, wherein the one or more processor are further configured to:
    receive first data comprising transaction information related with the first account;
    analyze the first data to predict the financial instrument transfer from the first account;
    push second data related to the portion of the disclosure relevant to the violation of the term of the disclosure to the computing device;
    receive a query from the computing device based on the second data; and
    push third data related to a second portion of the disclosure relating to the query from the computing device.

19. A non-transitory computer-readable storage medium comprising instructions that, when executed by a computer system, cause the computer system to:
    receive a request for first data comprising a first account from a computing device;
    identify, in response to the request, a financial history of the first account operating on a financial institution computing system;
    determine, based on the financial history, a plurality of financial instrument transfers to the first account exceeds a predetermined threshold;
    associate each financial instrument transfer of the determined plurality of financial instrument transfers with a respective calendar date;
    predict a financial instrument transfer based on the determined plurality of financial instrument transfers;
    predict a violation of a term of a disclosure related with the predicted financial instrument transfer based on a predicted account balance related to the first account being below the predetermined threshold consequent to the predicted financial instrument transfer from the first account;
    determine a section of the disclosure relevant to the predicted violation of the term of the disclosure consequent to analyzing first data associated with the first account; and
    transmit, based on the section of the disclosure relevant to the predicted violation of the term of the disclosure, data to a computing device related with the first account to visually prioritize upon display the determined section of the disclosure, wherein the data comprise a query to update the first account based on the predicted violation of the term of the disclosure associated with the financial instrument transfer.

20. The non-transitory computer readable medium of claim 19, wherein the instructions further cause the computer system to:
    receive first data comprising transaction information related with the first account;
    analyze the first data to predict the financial instrument transfer from the first account;
    push second data related to a portion of the disclosure relevant to the violation of the term of the disclosure to the computing device;
    receive a query from the computing device based on the second data; and
    push third data related to a second portion of the disclosure relating to the query from the computing device.

* * * * *